No. 793,725. PATENTED JULY 4, 1905.
S. H. JOHNSON.
APPARATUS FOR FILTERING LIQUIDS.
APPLICATION FILED SEPT. 6, 1904.
2 SHEETS—SHEET 2.
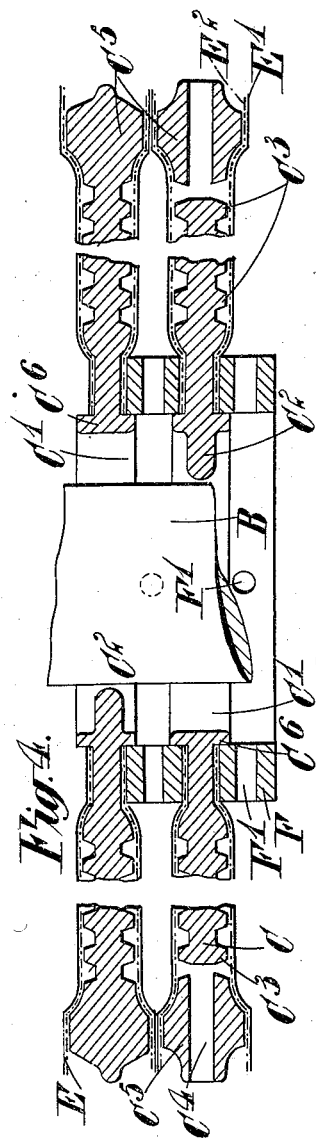
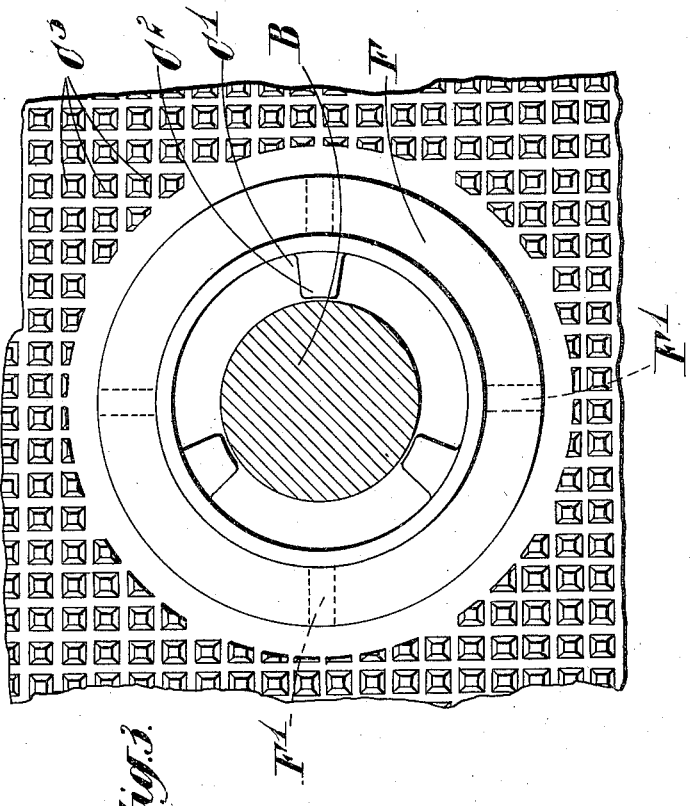
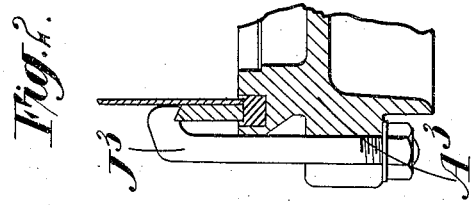
Witnesses
E. Warriner
Inventor
Samuel Henry Johnson
by Foster Freeman Watson
Attorneys No. 793,725.  
Patented July 4, 1905.

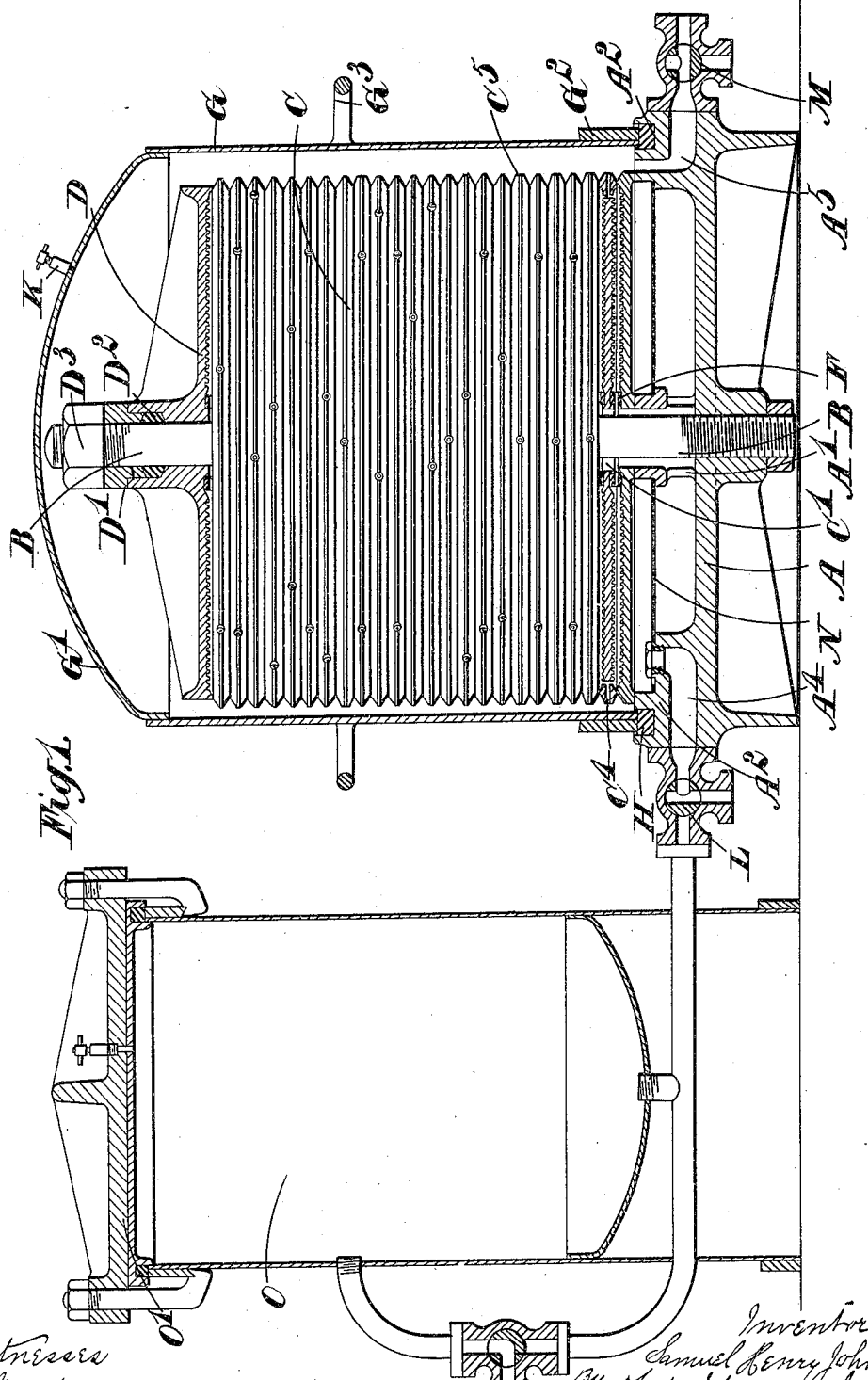

UNITED STATES PATENT OFFICE.

SAMUEL HENRY JOHNSON, OF STRATFORD, LONDON, ENGLAND, ASSIGNOR TO S. H. JOHNSON AND COMPANY, LIMITED, OF STRATFORD, LONDON, ENGLAND.

APPARATUS FOR FILTERING LIQUIDS.

SPECIFICATION forming part of Letters Patent No. 793,725, dated July 4, 1905.

Application filed September 6, 1904. Serial No. 223,410.

*To all whom it may concern:*

Be it known that I, SAMUEL HENRY JOHNSON, a subject of the King of England, residing at Stratford, London, England, have invented certain new and useful Improvements in Apparatus for Filtering Liquids, of which the following is a specification.

The present invention relates to improvements in apparatus for filtering liquids, and is specially applicable to the filtration of volatile or aerated liquids or in any case in which filtration has to be carried out under pressure—for example, when filtering beers or wines supersaturated with carbonic acid.

According to this invention the filter-press comprises a series of filter-chambers inclosed within an air-tight and water-tight casing. The casing may be secured on a base-plate provided with the necessary inlets and outlets for the liquid to be filtered. Preferably the base-plate carries a central vertical tie-rod, and a series of horizontal plates having central apertures are threaded onto the rod, and the apertures form with the rod an annular inlet-space. A follower is placed on the top of the plates, fitting onto the tie-rod with a stuffing-box or the like.

In arranging the filter-chambers according to this invention the filter-plates carry sheets of filtering material on both faces and contact with one another at their outer edges. The central joints between adjacent plates are formed by elastic collars perforated to introduce the liquid between the plates from the annular passage.

In order to remove large particles of solid matter from the liquid before it enters the filter-chambers, the base-plate may be provided with an inlet-passage and a central feed-passage, with a straining-plate arranged between them, so that the liquid before entering the annular passage has to pass down through the straining-plate.

In carrying out the process of filtration in certain cases it is advantageous to add to the liquid first introduced a small proportion of kieselguhr, which coats all the surfaces of the filtering media with a thin film of kieselguhr.

In the accompanying drawings, Figure 1 is a vertical section of a filter-press and feeding-receiver, illustrating one method of carrying this invention into effect. Fig. 2 is a detail vertical section showing the method of attaching the casing to the base-plate. Fig. 3 is a detail plan of part of one filter-plate as threaded onto the central tie-rod; and Fig. 4 is a detail vertical section of two adjacent plates, illustrating the joints between them.

Like letters of reference indicate like parts throughout the drawings.

On a base-plate or platen A is attached a vertical tie-rod B, and a series of recessed plates C, having circular apertures $C'$ at the center, are threaded onto the tie-rod B and rest on the base-plate A. Projections $C^2$ are formed inside the apertures $C'$ to form guides which insure the correct registration of the joint-surfaces of the plates C one on the other. On the top of the series of plates C a follower D is threaded over the central tie-rod B in the same way as the plates; but the follower D is provided with a stuffing-box $D'$ and a gland $D^2$, so as to make a water-tight joint round the bolt between the interior and exterior of the filter-chambers. A nut $D^3$ is screwed onto the top of the tie-rod B and serves to close and tighten the joints at the rims and centers of the consecutive plates forming the filter-chambers. The plates forming the filter are provided with grooved or bossed drainage-surfaces, preferably in the form of truncated pyramids $C^3$. The outlets $C^4$ for filtrate from the chambers are carried through the rims $C^5$ of the plates in the usual way, as is well known in filter-presses.

The filtering material E may be either of cloth or paper and for circular plates is made in the form of disks having central holes therein, which fit over annular projections $C^6$ in the center of the plates. When filtering-papers $E'$ are used, it is well to employ a filter-cloth $E^2$ underneath the paper. Both sides of each plate C are provided with filtering material E, and in order to insure a tight joint between the filtering material and the filter-plates round the central holes $C'$ an elastic collar F is employed, having perforations F' for the admission of liquid between the filtering-sheets on the upper and lower surfaces of the horizontal filtering-chambers. This collar F is made slightly deeper than the space in which it is confined after the machine is screwed up for work, so that a proper amount of compression shall be exerted sufficient to close the joints between the filtering material E and the metal plates C. The external joint at the circumference $C^5$ of the plates is truly faced, and the joints are made both at the center and at the circumference by screwing up the center bolt B. These collars F may be made of india-rubber or other elastic material of suitable character adapted to the liquid to be filtered. Thus, for instance, if beer or wine were the liquid being filtered, india-rubber may be used. In the case of bisulfid of carbon, on the other hand, another elastic material would have to be used insoluble therein—such, for instance, as the elastic compound of glue and treacle used for making printers' rollers, which is insoluble in bisulfid of carbon—or the collars may be metallic with springs to give the necessary elasticity.

The series of filtering-chambers arranged as described and bolted together by means of the central tie-rod B is fed through a passage A' in the base-plate delivering into the annular space formed by the central tie-rod B and the center hole C' in the filter-plates, the liquid to be filtered being then led into each chamber through the apertures F' in the elastic collars F. On forcing the liquid into the filter-press when the cells have been filled and the flow of the incoming liquid is continued under pressure the only means of exit for the liquid is through the filtering material E and the outlets $C^4$, as in an ordinary filter-press.

In order to prevent evaporation in case of volatile liquids or loss of pressure in case of liquids saturated with carbonic acid or other gas or contact with the air in the case of other liquids injured thereby, a strong metallic casing G is provided capable of sustaining the working pressure for which the apparatus is designed. This casing where circular plates are employed is preferably of cylindrical form, with a dome G' on the top and a strong strengthening ring or flange $G^2$ round the base, truly faced and making a joint upon an elastic packing-ring H, let into a groove $A^2$ in the platen or base-plate A and secured thereon water-tight by means of bolts $J^3$, attached to lugs or a flange $A^3$ round the platen. This casing or bell G is provided with an air-cock K at the top, so that when the filter is first started the whole of the air in the interior of the filter may be displaced, after which the air-cock is closed. Handles $G^3$ or other means of lifting the casing may be provided.

An inlet-passage $A^4$ is formed in one side of the base-plate and has connected thereto a cock L, preferably a three-way cock. An outlet-port $A^5$ is also formed in the base-plate communicating with the annular space between the filter-plates and the casing, and preferably a three-way outlet-cock M is attached to the outlet.

In the case of beer, wine, or other liquids where particles of solid matter, such as hops and the like, may be present a straining-chamber is formed in the base-plate and is provided with a perforated metal straining-plate N, with perforations of suitable size for removing the solid particles and preventing them from obstructing the small inlet-orifices F' through the elastic collars into the filtering-cells. The inlet-port $A^4$ is bent upward, and the straining-plate N is placed between the inlet-port $A^4$ and the feeding-passage A', so that the material before entering the inlet-passage A' has to pass down through the straining-plate, so that the whole of the matter strained out of the liquid under operation remains on the top of the straining-plate and can be easily removed.

The tank or receiver O, provided with an air-tight cover O', a pipe leading to the filter-press, and an outlet-valve for air is used when kieselguhr is added to the liquid.

The operation is as follows: When the filter is put in operation, the outlet-port $A^5$ is closed, the air-cock K is opened, and liquid is fed in through the inlet-port $A^4$ until the whole of the air in the casing has been displaced through the air-cock, which is then closed and the outlet-port $A^5$ is opened. The liquid may be forced through until the surfaces of the filtering material are so clogged that they can no longer be advantageously used or else until the chambers have been filled with the solid matter removed from the liquid. The inlet and outlet cocks are then turned so as to drain out the liquid both from the interior of the chambers and from the casing. The casing is then removed and the filtering material replaced. If desired, the three-way cocks may be replaced by separate inlet and outlet valves and drain-cocks.

In the case of fermented liquids, such as beers or wines, which are filtered under pressure, these may be delivered from the filter to a bottling-machine or the like without material loss of pressure.

It is to be understood that the details of the apparatus may be varied without departing from this invention.

What I claim as my invention, and desire to secure by Letters Patent, is—

1. In a filter-press for volatile and aerated liquids the combination of a series of recessed filter-plates having central inlets and circumferential outlets and arranged in contact with each other so that their recessed parts form a series of chambers, filtering material held by the plates between the outlets and the chambers, a plate on the end of the series having an inlet-port communicating with the central inlets for the liquid and an outlet-port for the filtrate, a gas-tight casing for inclosing the said chambers and means for hermetically jointing the casing to the base-plate.

2. In a filter-press for volatile and aerated liquids the combination of a series of recessed filter-plates having a central feed-space and circumferential outlets and arranged in contact with each other so that their recessed parts form a series of chambers, filtering material held by the plates between the outlets and the chambers, a central rod for holding the chambers together and forming with the chambers a central annular feed-space, a plate on the end of the series having an inlet-port communicating with the central feed-space for the liquid and an outlet-port for the filtrate and means for closing one end of the central annular feed-space and causing the liquid to pass radially from the said space through the filter-chambers.

3. In a filter-press for volatile and aerated liquids the combination of a series of recessed filter-plates having a central feed-space and circumferential outlets and arranged in contact with each other so that their recessed parts form a series of chambers, filtering material held by the plates between the outlets and the chambers, a central rod for holding the chambers together and forming with the chambers a central annular feed-space, a plate on the end of the series having an inlet-port communicating with the central feed-space for the liquid and an outlet-port for the filtrate, means for closing one end of the central annular feed-space and causing the liquid to pass radially from the said space through the filter-chambers, a gas-tight casing for inclosing the said chambers and means for hermetically jointing the casing to the base-plate.

4. In a filter-press for volatile or aerated liquids the combination of a series of filter-chambers having circumferential outlets, a plate on the end of the series having an inlet-port communicating with the central annular feed-space for the liquid and an outlet-port for the filtrate, a horizontal straining-plate situated between the inlet-port of the end plate of the series of chambers and the central feed-space of the chambers, a gas-tight casing for inclosing the said chambers and means for hermetically jointing the casing to the end plate.

5. In a filter-press for volatile or aerated liquids the combination of a series of recessed filter-plates centrally and circumferentially perforated and horizontally arranged one above the other so that their recessed parts form a series of chambers, elastic perforated packing-rings disposed between the plates and around their central perforations to form a central feed-space with the plates, filtering material on the faces of the plates between the central feed-space and the circumferential outlets of the plates, a horizontal end plate having an inlet-port communicating with a central inlet-passage for the liquid and leading into the central feed-space of the filter-chambers, a horizontal follower closing the upper end of the said central feed-space, a central vertical tie-rod connected to the end plate passing centrally through the vertical feed-space secured in a fluid-tight manner to the follower and holding the filter-plates in position.

6. In a filter-press for volatile or aerated liquids the combination of a series of recessed filter-plates centrally and circumferentially perforated and horizontally arranged one above the other so that their recessed parts form a series of chambers, elastic perforated packing-rings disposed between the plates and around their central perforations to form a central feed-space with the plates, filtering material on the faces of the plates between the central feed-space and the circumferential outlets of the plates, a horizontal end plate having an inlet-port communicating with a central inlet-passage for the liquid and leading into the central feed-space of the filter-chambers, a horizontal follower closing the upper end of the said central feed-space, a central vertical tie-rod connected to the end plate passing centrally through the vertical feed-space secured in a fluid-tight manner to the follower and holding the filter-plates in position, a gas-tight removable cylindrical casing, closed at one end and adapted to fit the horizontal end plate at the other, and bolts to engage both the gas-tight casing and the end plate and to hermetically joint them together.

7. In a filter-press for volatile or aerated liquids the combination of a series of recessed filter-plates centrally and circumferentially perforated and horizontally arranged one above the other so that their recessed parts form a series of chambers, elastic perforated packing-rings disposed between the plates and around their central perforations to form a central feed-space with the plates, filtering material on the faces of the plates between the central feed-space and the circumferential outlets of the plates, a horizontal end plate having an inlet-port communicating with a central inlet-passage for the liquid and leading into the central feed-space of the filter-chambers, a horizontal straining-plate situated between the inlet-port and the said central inlet-passage, a horizontal follower closing the upper end of the said central feed-space, a central vertical tie-rod connected to the end plate passing centrally through the vertical feed-space secured in a fluid-tight manner to the follower and holding the filter-plates in position, a gas-tight removable cylindrical casing closed at one end and adapted to fit the horizontal end plate at the other, and bolts to engage both the gas-tight casing and the end plate and to hermetically joint them together.

In testimony whereof I have signed my name to this specification in the presence of two subscribing witnesses.

SAMUEL HENRY JOHNSON.

Witnesses:
HARRY B. BRIDGE,
CLAUDE McKENZIE.